United States Patent
Kim et al.

(10) Patent No.: US 10,505,716 B2
(45) Date of Patent: Dec. 10, 2019

(54) SYSTEM, APPARATUS, AND METHOD FOR SECURING DATA USING A GRAPHICS PROCESSOR

(71) Applicant: Dark Matter L.L.C., Dubai (AE)

(72) Inventors: Jung Woo Kim, Abu Dhabi (AE); Juha Park, Abu Dhabi (AE); Pyung Soo Hwang, Abu Dhabi (AE); Tymur Korkishko, Abu Dhabi (AE); Michael Chin-Hwan Pak, Portland, OR (US)

(73) Assignee: DARK MATTER L.L.C., Dubai (AE)

( * ) Notice: Subject to any disclaimer, the term of this patent is extended or adjusted under 35 U.S.C. 154(b) by 292 days.

(21) Appl. No.: 15/439,819

(22) Filed: Feb. 22, 2017

(65) Prior Publication Data

US 2018/0241547 A1    Aug. 23, 2018

(51) Int. Cl.
   H04L 29/06    (2006.01)
   H04L 9/06    (2006.01)

(52) U.S. Cl.
   CPC .................... H04L 9/0637 (2013.01)

(58) Field of Classification Search
   CPC ....................................................... H04L 9/0637
   See application file for complete search history.

(56) References Cited

PUBLICATIONS

International Search Report and Written Opinion for PCT Application No. PCT/IB2018/0151124, dated Apr. 13, 2018.
Zola et al., "Parallel Speculative Encryption of Multiple AES Contexts on GPUs," Innovative Parallel Computing (InPar), 2012, pp. 1-9.
Ottesen, A., "Efficient parallelisation techniques for applications running on GPUs using the CUDA framework," May 2009, pp. 1-133, as retrieved from https://www.duo.uio.no/bitstream/handle/10852/10057/Ottesen.pdf?sequence=1&isAllowed=y.
Suzuki et al., "Parallelization of Cipher Algorithm on CPU/GPU for Real-time Software-Defined Access Network," Proceedings of APSIPA Annual Summit and Conference 2015, Dec. 2015, pp. 484-487.
Dolbeau, R., "An hybrid AES-256-GCM implementation for NEON CPU & CUDA GPU," Nov. 2014, pp. 1-11, as retrieved from https://pdfs.semanticscholar.org/11f8/c4ebf3955b6fb5d321f08cb570f862a6c1d4.pdf.
Schönberger et al., "GPU-assisted AES encryption using GCM," Communications and Multimedia Security, CMS 2011, Lecture Notes in Computer Science, vol. 7025, pp. 178-185.
Maistri et al., "Implementation of the advanced encryption standard on gpus with the nvidia cuda framework," 2011 IEEE Symposium on Industrial Electronics and Applications (ISIEA), 2011, pp. 213-217.
Nvidia, "CUDA C Programming Guide," PG-02829-001_v7.5, Sep. 2015 Design Guide, pp. 1-261, as retrieved from https://www3.nd.edu/~zxu2/acms60212-40212/CUDA_C_Programming_Guide_V7.5.pdf.
Di Pietro et al., "CUDA Leaks: Information Leakage in GPU Architectures" arXiv:1305.7383v2, Jul. 15, 2013, pp. 1-19, as retrieved from https://arxiv.org/pdf/1305.7383.pdf.

(Continued)

*Primary Examiner* — John B King
(74) *Attorney, Agent, or Firm* — Zilka-Kotab, P.C.

(57) ABSTRACT

A system, apparatus, and method are provided for securing data using a graphics processor. Included is a central processor in communication with a graphics processor. The graphics processor is configured to generate a plurality of key streams utilizing a counter mode of operation. Further, the central processor is configured to perform an XOR operation on the plurality of key streams and data.

16 Claims, 8 Drawing Sheets

(56) References Cited

PUBLICATIONS

Dworkin, M., "Recommendation for Block Cipher Modes of Operation: Galois/Counter Mode (GCM) and GMAC," NIST Special Publication 800-38D, Nov. 2007, pp. 1-39, as retrieved from https://nvlpubs.nist.gov/nistpubs/legacy/sp/nistspecialpublication800-38d.pdf.

Hayes et al., "GPU Taint Tracking," Proceedings of the 2017 USENIX Conference on Usenix Annual Technical Conference, Jul. 2017, pp. 209-220, as retrieved from https://www.cs.rutgers.edu/~zz124/atc17.pdf.

McGrew et al., "The Galois/Counter Mode of Operation (GCM)," May 2005, pp. 1-43, as retrieved from http://luca-giuzzi.unibs.it/corsi/Support/papers-cryptography/gcm-spec.pdf.

Dworkin, M., "Recommendation for Block Cipher Modes of Operation," NIST Special Publication 800-38A, 2001 Edition, Dec. 2001, pp. 1-66.

McGrew et al., "The Galois/counter mode of operation (GCM)," Submission to NIST Modes of Operation Process, 2004, pp. 1-43.

Lipmaa et al., "Comments to NIST concerning AES modes of operation: CTR-mode encryption," 2000, pp. 1-4.

Patterson, M., "Vulnerability analysis of GPU computing," Graduate Theses and Dissertations, Paper 13115, 2013, pp. 1-48.

Pietro et al., "CUDA Leaks: A Detailed Hack for CUDA and a (Partial) Fix," ACM Transactions on Embedded Computing Systems (TECS), vol. 15, No. 1, Feb. 2016, pp. 1-25.

SYSTEM, APPARATUS, AND METHOD FOR SECURING DATA USING A GRAPHICS PROCESSOR

FIELD OF THE INVENTION

The present invention relates to security systems, and more particularly to security systems for protecting data using a graphics processor.

BACKGROUND

The computing power of graphics processing units (GPUs) has increased rapidly, and there has been extensive research on general-purpose computing on GPU (GPGPU) for cryptographic algorithms such as Advanced Encryption Standard (AES), Rivest-Shamir-Adleman (RSA), Elliptic-curve-cryptography (ECC), and NTRU. However, GPUs have security vulnerabilities in connection with memory management. To mitigate such vulnerabilities, secret information in memory of the GPU should be manually flushed as zeroes. This, however, detrimentally affects performance.

There is thus a need for addressing these and/or other needs of the prior art.

SUMMARY

A system, apparatus, and method are provided for securing data using a graphics processor. Included is a central processor in communication with a graphics processor. The graphics processor is configured to generate a plurality of key streams utilizing a counter mode of operation. Further, the central processor is configured to perform an XOR operation on the plurality of key streams and data.

In a first embodiment, the counter mode of operation may include a Galois Counter Mode (GCM) of operation.

In a second embodiment (which may or may not be combined with the first embodiment), the data may include at least one of plaintext or ciphertext.

In a third embodiment (which may or may not be combined with the first and/or second embodiments), the central processor may be further configured to transfer only a key and a counter to the graphics processor for use in connection with the generation of the plurality of key streams.

In a fourth embodiment (which may or may not be combined with the first, second, and/or third embodiments), the central processor may be further configured to avoid transfer of the data to the graphics processor in connection with the generation of the plurality of key streams.

In a fifth embodiment (which may or may not be combined with the first, second, third, and/or fourth embodiments), the graphics processor may include a plurality of processing elements and is further configured to: utilize a counter in connection with the generation of the plurality of key streams, and adjust the counter for each of the plurality of processing elements. As an option, the graphics processor may be further configured to adjust the counter based on a number of the processing elements and a size of a key stream buffer. As a further option, the graphics processor may further include a plurality of processing elements and may be further configured to adjust an initialization vector for each of the plurality of processing elements.

In a sixth embodiment (which may or may not be combined with the first, second, third, fourth, and/or fifth embodiments), the graphics processor may be further configured to transfer a first portion of the plurality of key streams in parallel with the generation of a second portion of the plurality of key streams. As an option, the graphics processor may be further configured to allocate one or more key stream buffers for the plurality of key streams, such that the one or more key stream buffers is used to store the first portion of the plurality of key streams and is further reused to store the second portion of the plurality of key streams.

In a seventh embodiment (which may or may not be combined with the first, second, third, fourth, and/or fifth embodiments), the graphics processor may be further configured to allocate one or more key stream buffers for the plurality of key streams, and delete the one or more key stream buffers after a transfer of at least a portion of the plurality of key streams.

In another graphics processor embodiment, an apparatus is provided including a graphics processor configured for communication with a central processor. The graphics processor is further configured to: generate a plurality of key streams via a counter mode of operation, and transfer the key streams to the central processor for performing an XOR operation on the plurality of key streams and data.

In a first embodiment, the graphics processor may be further configured to receive only a key and a counter for use in connection with the generation of the plurality of key streams. As an option, the graphics processor may be further configured to avoid receipt of the data in connection with the generation of the plurality of key streams.

In a second embodiment (which may or may not be combined with the first embodiment), the graphics processor may include a plurality of processing elements and may be further configured to: utilize a counter in connection with the generation of the plurality of key streams, and adjust the counter for each of the plurality of processing elements. As an option, the graphics processor may be further configured to adjust the counter based on a number of the processing elements and a size of a key stream buffer. As an additional option, the graphics processor may be further configured to adjust the counter based on a number of the processing elements and a size of a key stream buffer.

In a third embodiment (which may or may not be combined with the first and/or second embodiments), the graphics processor may be further configured to transfer a first portion of the plurality of key streams in parallel with the generation of a second portion of the plurality of key streams. As an option, the graphics processor may be further configured to allocate one or more key stream buffers for the plurality of key streams, such that the one or more key stream buffers is used to store the first portion of the plurality of key streams and is further reused to store the second portion of the plurality of key streams.

In a fourth embodiment (which may or may not be combined with the first, second, and/or third embodiments), the graphics processor may be further configured to allocate one or more key stream buffers for the plurality of key streams, and delete the one or more key stream buffers after a transfer of at least a portion of the plurality of key streams.

In a fifth embodiment (which may or may not be combined with the first, second, third, and/or fourth embodiments), the graphics processor may be further configured to allocate one or more key stream buffers for the plurality of key streams, and delete the one or more key stream buffers after a transfer of at least a portion of the plurality of key streams.

In another central processor embodiment, an apparatus is provided including a central processor configured for communication with a graphics processor, and to transfer information to the graphics processor for generation of a plurality of key streams via a counter mode of operation. Further, the central processor may be further configured to perform an XOR operation on the plurality of key streams and data.

In a first embodiment, the information may include a counter and a key.

In a second embodiment (which may or may not be combined with the first embodiment), the central processor may be further configured to transfer only a key and a counter to the graphics processor for use in connection with the generation of the plurality of key streams.

In a third embodiment (which may or may not be combined with the first and/or second embodiments), the central processor may be further configured to avoid transfer of the data to the graphics processor in connection with the generation of the plurality of key streams.

In yet another method embodiment, such method receives, from a central processor, a counter and a key at a graphics processor configured for communication with the central processor. Further, a plurality of key streams is generated via a counter mode of operation, utilizing the graphics processor. Still yet, the key streams are transferred to the central processor for performing an XOR operation on the plurality of key streams and data.

DETAILED DESCRIPTION

Figure 1:
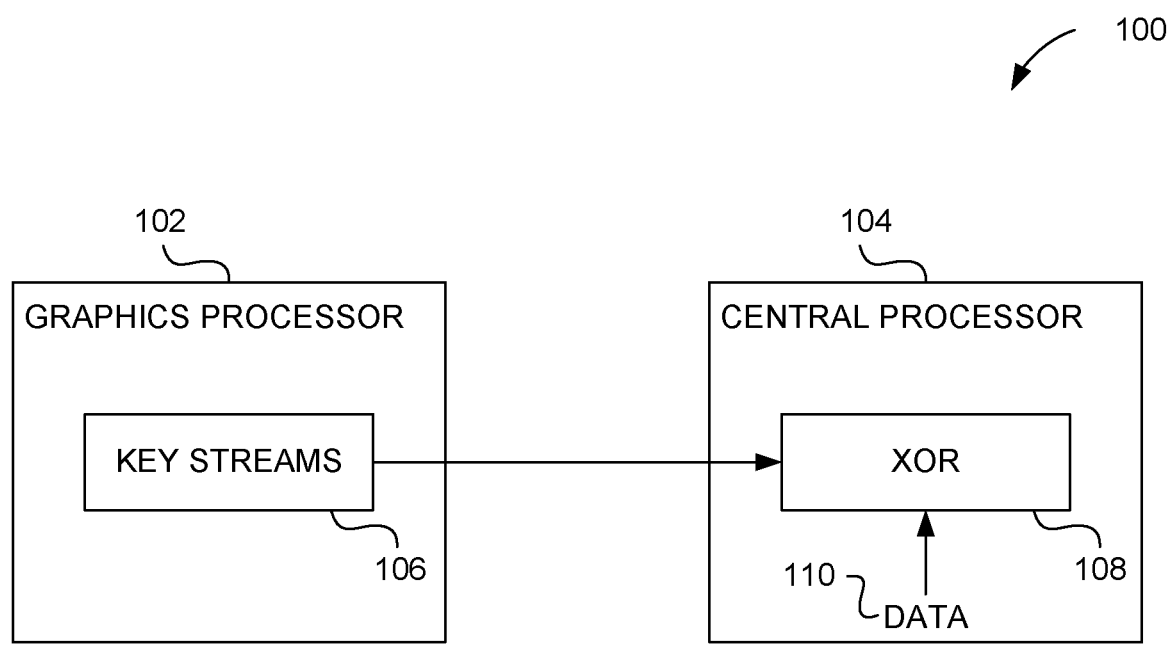
FIG. 1 illustrates a system for securing data using a graphics processor, in accordance with one embodiment.

FIG. 1 illustrates a system 100 for securing data using a graphics processor, in accordance with one embodiment. As shown, a graphics processor 102 is provided that is in direct (or indirect) communication with a central processor 104. In the context of the present description, the graphics processor 102 may refer to any processor that is capable of working in connection with a central processor for performing graphics processing and possibly other tasks. In one embodiment, such graphics processor 102 may include a graphics processing unit (GPU) or even a GPU that is capable of some general purpose computing (GPGPU). For example, in various embodiments, the graphics processor 102 may include a transform module, a lighting module, and a rasterization module implemented in dedicated hardware.

Also in the context of the present description, the central processor 104 may refer to any processor that is capable of working in connection with the graphics processor 102 and perform one or more general computing functions. For example, in one embodiment, the central processor 104 may include a central processing unit (CPU). Further, the system 100 is not limited to a single central processor 104, but may include multiple central processors 104 (and/or even multiple graphics processor 102) in other embodiments.

With continuing reference to FIG. 1, the graphics processor 102 is configured to generate a plurality of key streams 106 utilizing a counter mode of operation. In the context of the present description, such key streams may include any set of characters that is capable of being used as a key. For example, in one embodiment, the key streams may include streams of random or pseudorandom characters that are capable of being combined with plaintext to produce an encrypted message, or ciphertext. In various embodiments, the aforementioned characters may be bits, bytes, numbers or actual characters like A-Z.

Also in the context of the present description, the counter mode of operation may refer to any mode of operation that may be used to employ a block cipher (e.g. fixed group of bits, etc.) to support a stream cipher, whereby one or more plaintext digits may be encrypted with a corresponding one or more digits of the key streams 106, in order to produce one or more digits of a cipher stream, as will soon become apparent. In various embodiments, the aforementioned counter can be any function which produces a sequence which does not repeat for a sufficient time period. For example, in one specific embodiment, an increment-by-one counter may be used. Non-limiting examples of a counter mode of operation include an integer counter mode (ICM), a segmented integer counter (SIC) mode, a Galois Counter Mode (GCM) of operation, etc.

As shown in FIG. 1, the central processor 104 is configured to perform an XOR operation 108 on the plurality of key streams 106 and data 110. In various embodiments, such data 110 may include plaintext and/or ciphertext. Further, in the context of the present description, the XOR operation 108 may refer to any exclusive OR, or exclusive disjunction, that includes a logical operation that outputs true only when inputs differ.

More illustrative information will now be set forth regarding various optional architectures and uses in which the foregoing method may or may not be implemented, per the desires of the user. For example, in various embodiments to be described, encryption/decryption may be performed in parallel, using both central and graphics processors. It should be noted that the following information is set forth for illustrative purposes and should not be construed as limiting in any manner. Any of the following features may be optionally incorporated with or without the exclusion of other features described.

Figure 2:
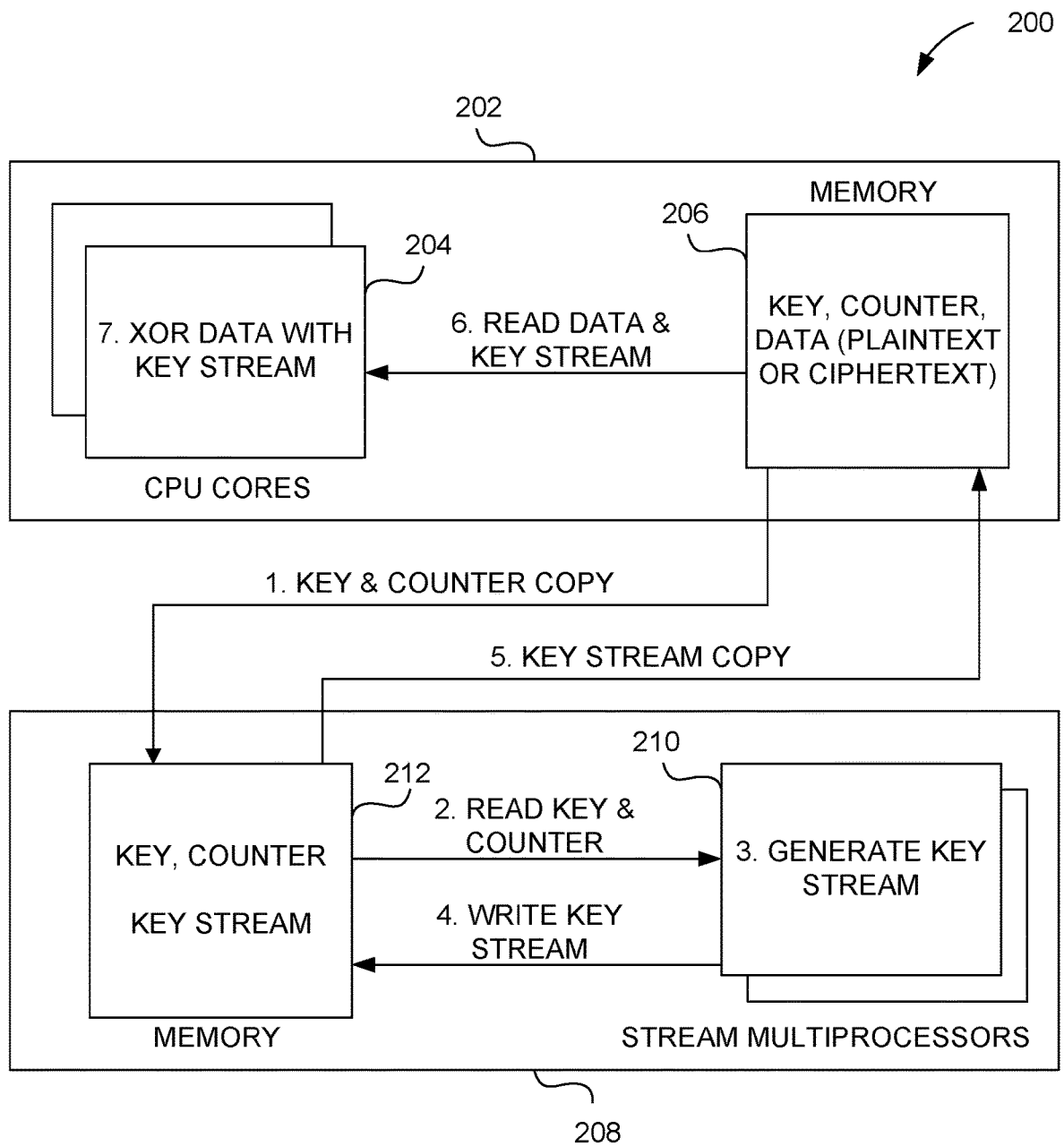
FIG. 2 illustrates a system for securing data using a graphics processor, in accordance with another embodiment.

FIG. 2 illustrates a system 200 for securing data using a graphics processor, in accordance with one embodiment. As an option, the system 200 may be implemented in the context of any one or more of the embodiments set forth in any previous and/or subsequent figure(s) and/or description thereof. However, it is to be appreciated that the system 200 may be implemented in the context of any desired environment.

As shown, a central processor 202 is provided that is in direct (or indirect) communication with a graphics processor 208. The central processor 202 includes a plurality of processing elements 204 (e.g. cores, etc.) that remain in communication with central processor memory 206. While such central processor memory 206 is shown to be integrated on the central processor 202, other embodiments are contemplated where such central processor memory 206 may reside on a separate, discrete component (e.g. off-chip memory on a motherboard, etc.).

The graphics processor 208 includes a plurality of processing elements which, in one embodiment, may take the form of stream multiprocessors 210 that remain in communication with graphics processor memory 212. While such graphics processor memory 212 is shown to be integrated on the graphics processor 208, other embodiments are contemplated where such graphics processor memory 212 may reside on a separate, discrete component [e.g. in off-chip dynamic random access memory (DRAM) on a graphics board, etc.]. In use, the stream multiprocessors 210 of the graphics processor 208 may be used for accelerating the performance of tasks such as mathematical and scientific computations including encryption/decryption. This may be accomplished, in various embodiments, using an application programming interface (API) provided by CUDA or OpenCL.

The stream multiprocessors 210 may each include a programmable streaming processor with multiple cores that are configured to process tasks represented by a number of threads. Further, each of the stream multiprocessors may be multi-threaded and configured to execute a plurality of threads concurrently. In one embodiment, the stream multiprocessors 210 may include a SIMD (Single-Instruction, Multiple-Data) architecture where each thread in a group of threads is configured to process a different set of data based on the same set of instructions. In such embodiment, the threads in the group of threads execute the same instructions. In another embodiment, the stream multiprocessors 210 may each include a SIMT (Single-Instruction, Multiple Thread) architecture where each thread in a group of threads is configured to process a different set of data based on the same set of instructions.

In use, in response to one or more instructions of the central processor 202 and/or graphics processor 208, the graphics processor 208 transfers (e.g. copies, etc.) a key and a counter from the central processor memory 206 to the graphics processor memory 212. See operation 1. For reasons that will soon become apparent, the central processor 202 may be further configured to transfer only the key and the counter to the graphics processor for use in connection with the generation of the key streams, so as to avoid transfer of any data (e.g. plaintext) to the graphics processor 208 in connection with the generation of the key streams.

To this end, exposure of the data may be limited, and time-consuming data transfer may be avoided, in some possible embodiments. It should be noted that key/counter sizes are small compared to that of plaintext or ciphertext (e.g., in AES, counter size is 16 bytes; and key sizes are 16, 24, and 32 bytes). Further, key stream generation may be performed in a control mode of operation, for reducing an amount of data/key information retrieval from the aforementioned memory.

Next, in operation 2, such key and counter are read from the graphics processor memory 212 by one or more of the stream multiprocessors 210 for use in generating a plurality of key streams, per operation 3. Such key streams are then written to the graphics processor memory 212 of the graphics processor 208 in operation 4.

To this end, in response to one or more instructions of the central processor 202 and/or graphics processor 208, the central processor 202 transfers (e.g. copies, etc.) the key streams from the graphics processor memory 212 to the central processor memory 206. See operation 5. In one embodiment, the graphics processor 208 may be further configured to transfer a first portion of the key streams in parallel with the generation of a second portion of the key streams. As a further option, the graphics processor 208 may be configured to allocate one or more key stream buffers (in the graphics processor memory 212) for the key streams, such that the one or more key stream buffers is used to store the first portion of the key streams and is further reused to store the second portion of the key streams, in a manner that will be elaborated upon later. In such optional embodiments, the parallel generation/transfer of the key streams may enable the use of a smaller buffer size to store such key streams (or portion thereof) prior to transfer. Such smaller buffer size (and reuse thereof) may, in turn, require less time to clear the same when the key stream transfer is completed.

Further, the central processor 202 reads one or more of the key streams in operation 6 for the purpose of performing an XOR operation on the key streams and data. See operation 7. In use in accordance with one embodiment, the processing elements 204 of the central processor 202 and the stream multiprocessors 210 of the graphics processor 208 may perform the foregoing functions simultaneously in parallel, for more effective, efficient encryption/decryption.

As mentioned earlier, the graphics processor 208 may, in some embodiments, exhibit security vulnerabilities in connection with memory management. To mitigate such vulnerabilities, any secret information (e.g. keys, plaintext, etc.) in the graphics processing memory 212 may be manually flushed as zeroes. However, to the extent that this is done, it may detrimentally affect system performance in a manner that is proportional to a size of the corresponding allocated buffers in the graphics processor memory 212.

By the foregoing design, encryption/decryption may be performed in parallel, using both the central and graphics processors 202, 208. Further, in some optional embodiments, a faster and more secure implementation may be afforded by reducing the time for transferring data between the central processor memory 206 and the graphics processing memory 212, more effectively utilizing the computing power of the central processor 202 as well as that of graphics processor 208, and further reducing a size of buffers that are to be flushed as zeros in the graphics processing memory 212 after operation is complete.

Figure 3:
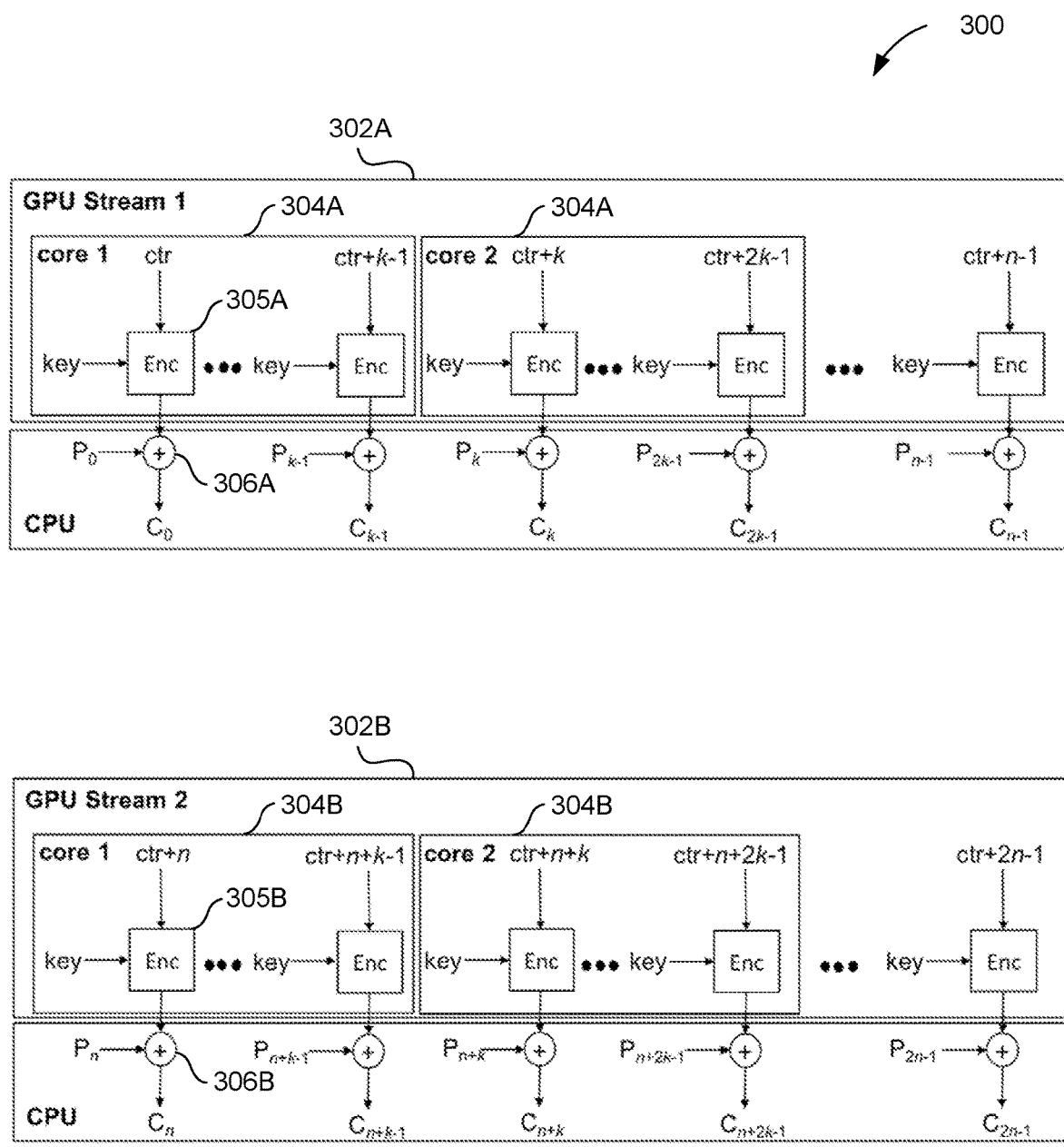
FIG. 3 illustrates a system for securing data using a graphics processor, in accordance with another embodiment.

FIG. 3 illustrates a system 300 for securing data using a graphics processor, in accordance with one embodiment. As an option, the system 300 may be implemented in the context of any one or more of the embodiments set forth in any previous and/or subsequent figure(s) and/or description thereof. For example, the system 300 may be implemented in the context of the system 100 of FIG. 1 and/or the system 200 of FIG. 2. However, it is to be appreciated that the system 300 may be implemented in the context of any desired environment.

As shown, a plurality of graphics processor streams 302A, 302B are provided, which are processed by corresponding streaming multiprocessors 304A, 304B of a graphics processor (e.g. graphics processor 208 of FIG. 2). In response to a completion of the receipt of a key and a counter (ctr) at the graphics processor from a central processor (e.g. central processor 202 of FIG. 2), the streaming multiprocessors 304A, 304B of the graphics processor utilize a respective encryption algorithm 305A, 305B to process the key and counter, in order to generate key streams. Further, the counter is adjusted for each of the streaming multiprocessors 304A, 304B, based on a number of the streaming multiprocessors 304A, 304B and a size of a key stream buffer. Specifically, in one possible embodiment, each processing core in the streaming multiprocessors 304A, 304B of the graphics processor computes k blocks of a cipher for $k \geq 1$, and the counter values for the i-th processing core of the graphics processor stream 1 302A are $(i-1) \cdot k + j$ + the counter value copied from the central processor for j=0, ..., k−1. Thereafter, the key stream is then written in a global memory of the graphics processor.

Further, as shown, the key streams are copied to central processor memory in order to compute an XOR 306A, 306B of the key stream and data using respective processing elements (e.g. cores, etc.) of the central processor. As mentioned earlier, the central processor and graphics processor compute their tasks in parallel. That is, the key stream generation and XOR 306A, 306B computation may be executed concurrently.

To this end, overlapping graphics processor key stream generation and transfer may not only make the data transfer more efficient, but also reduce a size of a required buffer in graphics processor memory. To overlap the computation in the graphics processor and the transfer, a graphics processor stream may be used which is a sequence of operations that execute on the graphics processor in an order that they are issued. Further, the key stream is broken up into n portions (e.g. chunks, etc.). That is, each of n graphics processor streams computes a chunk of the key stream, and copies the chunk from graphics processor memory to central processor memory. Specifically, as shown in FIG. 3, a first k blocks are computed by core 1 in graphics processor stream 1, the next k blocks by core 2 in graphics processor stream 1, and so on. Also, all XOR 306A, 306B computation may be performed by the central processor cores.

In one embodiment, after the key generation/copying by the graphics processor is complete, graphics processor memory may not necessarily be flushed as zeros, even though a corresponding process in the graphics processor has completed. To this end, in one possible embodiment, a software developer may manually flush the key and the key stream in the graphics processor memory when and if all computations in the graphics processor are complete. While the key size is small, the size of the key stream may be equal to the size of the plaintext or ciphertext, thus requiring a sizable amount of flushing. Therefore, to improve the performance further in accordance with one possible embodiment, the size of the buffer (storing the key steams) may be reduced, in a manner that will now be elaborated upon.

Figure 4:
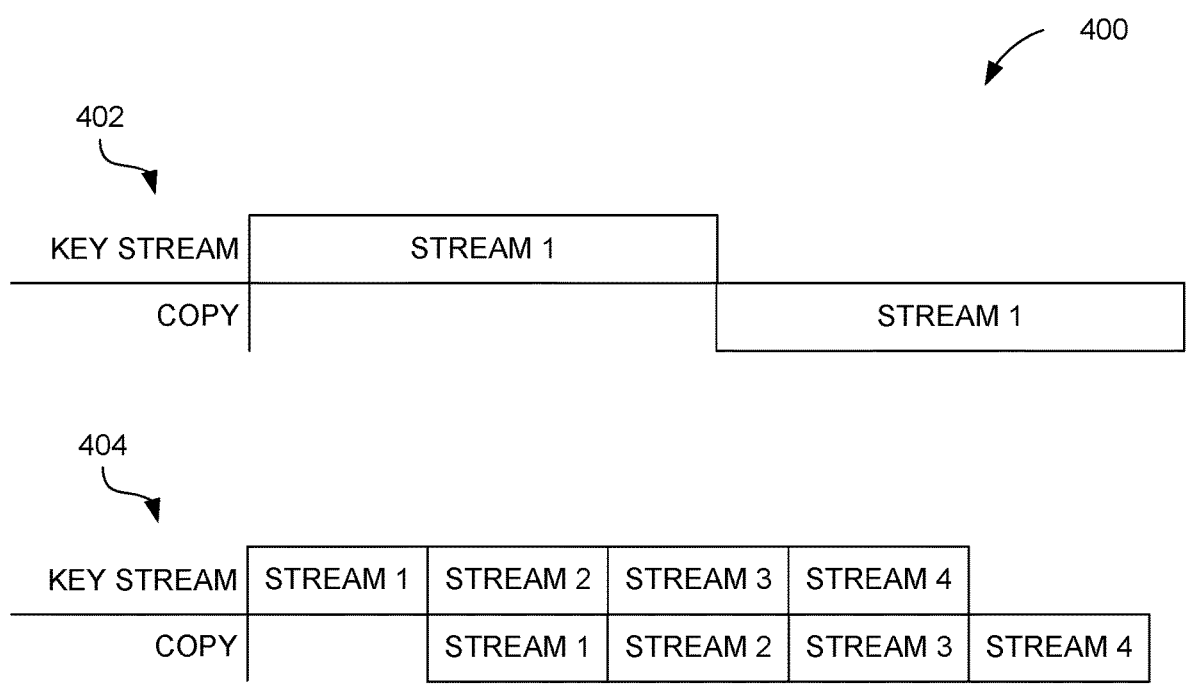
FIG. 4 illustrates a framework for generating key streams and transferring the same in parallel, in accordance with one embodiment.

FIG. 4 illustrates a framework 400 for generating key streams and transferring the same in parallel, in accordance with one embodiment. As an option, the framework 400 may be implemented in the context of any one or more of the embodiments set forth in any previous and/or subsequent figure(s) and/or description thereof. For example, the framework 400 may be implemented in the context of the system 300 of FIG. 3. However, it is to be appreciated that the framework 400 may be implemented in the context of any desired environment.

As shown, in one possible sequential embodiment 402, a key stream may be generated and, only after completion of such key stream generation, such key stream may be transferred. In another parallel embodiment 404, such key stream generation and transfer may overlap, as shown. Specifically, a graphics processor may be further configured to reduce a size of the key streams (and associated buffer), such that different portions of such key streams may be simultaneously generated/stored, and transferred. For example, a first portion of the key streams (e.g. Stream 1) may be transferred in parallel with the generation of a second portion of the key streams (e.g. Stream 2). Further, the graphics processor may allocate one or more key stream buffers for the key streams, and delete the one or more key stream buffers after a transfer of at least a portion of the key streams (in order to make room for storing a next key stream portion to be generated).

To this end, operations in different streams may run concurrently. As shown in FIG. 4, if multiple streams are used, graphics processor execution (e.g. labeled "stream") of the (i+1)-th stream and data transfer (e.g. labeled "copy") of the i-th stream may overlap. As a result, the time required for transferring data may be reduced.

By processing multiple streams in such manner, only a few allocated buffers are needed for all streams. Further, such buffers may be reused, and flushed at the end of graphics processor execution. The number of the buffers to be maintained may depend on a difference between a first time taken for graphics processor execution and a second time taken for data transfer. If the time for data transfer is less than or equal to that for graphics execution, only two buffers are sufficient. By this design, only two buffers may be flushed as zeros, and the time for flushing may be further optimized.

Figure 5:
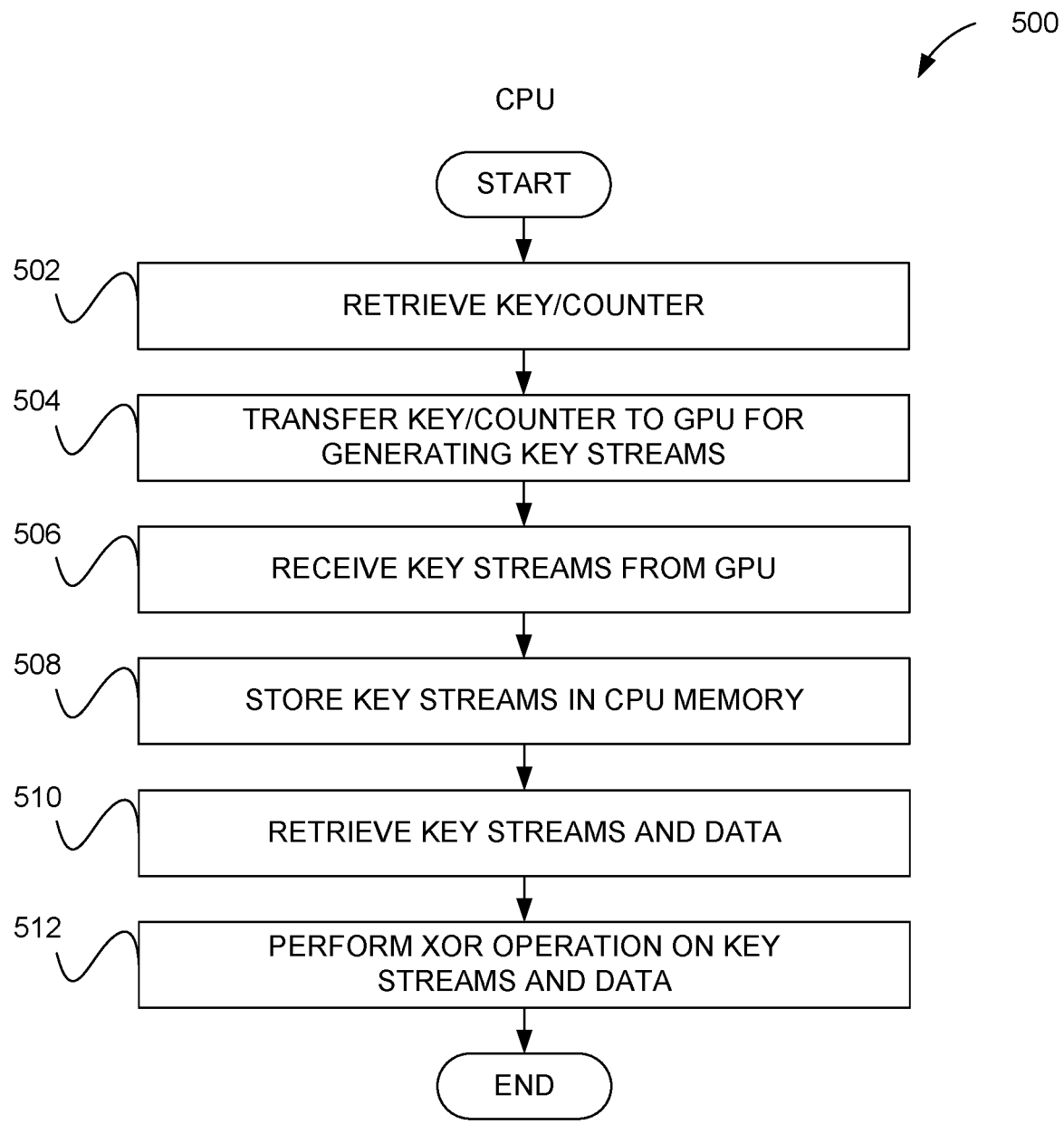
FIG. 5 illustrates a method for securing data using a graphics processor, in accordance with a central processor embodiment.

FIG. 5 illustrates a method 500 for securing data using a graphics processor, in accordance with a central processor embodiment. As an option, the method 500 may be implemented in the context of any one or more of the embodiments set forth in any previous and/or subsequent figure(s) and/or description thereof. For example, the method 500 may be carried out in the context of the central processor 104 of FIG. 1 and/or the central processor 202 of FIG. 2. However, it is to be appreciated that the method 500 may be implemented in the context of any desired environment.

As shown, the central processor (e.g. the central processor 104 of FIG. 1 and/or the central processor 202 of FIG. 2) may retrieve a key and a counter in operation 502, after which such key and counter are transferred to a graphics processor (e.g. the graphics processor 102 of FIG. 1 and/or the graphics processor 208 of FIG. 2). See operation 504. At this point, the graphics processor generates and transfers the key streams. More information regarding such process will be set forth during the description of the subsequent figure.

With continuing reference to FIG. 5, the central processor receives the key streams from the graphics processor in operation 506. In operation 508, such key streams are stored in central processor memory along with any data to be encrypted/decrypted. By this design, the key streams and data may be retrieved in operation 510, for being used in performing XOR operations thereon, per operation 512.

Figure 6:
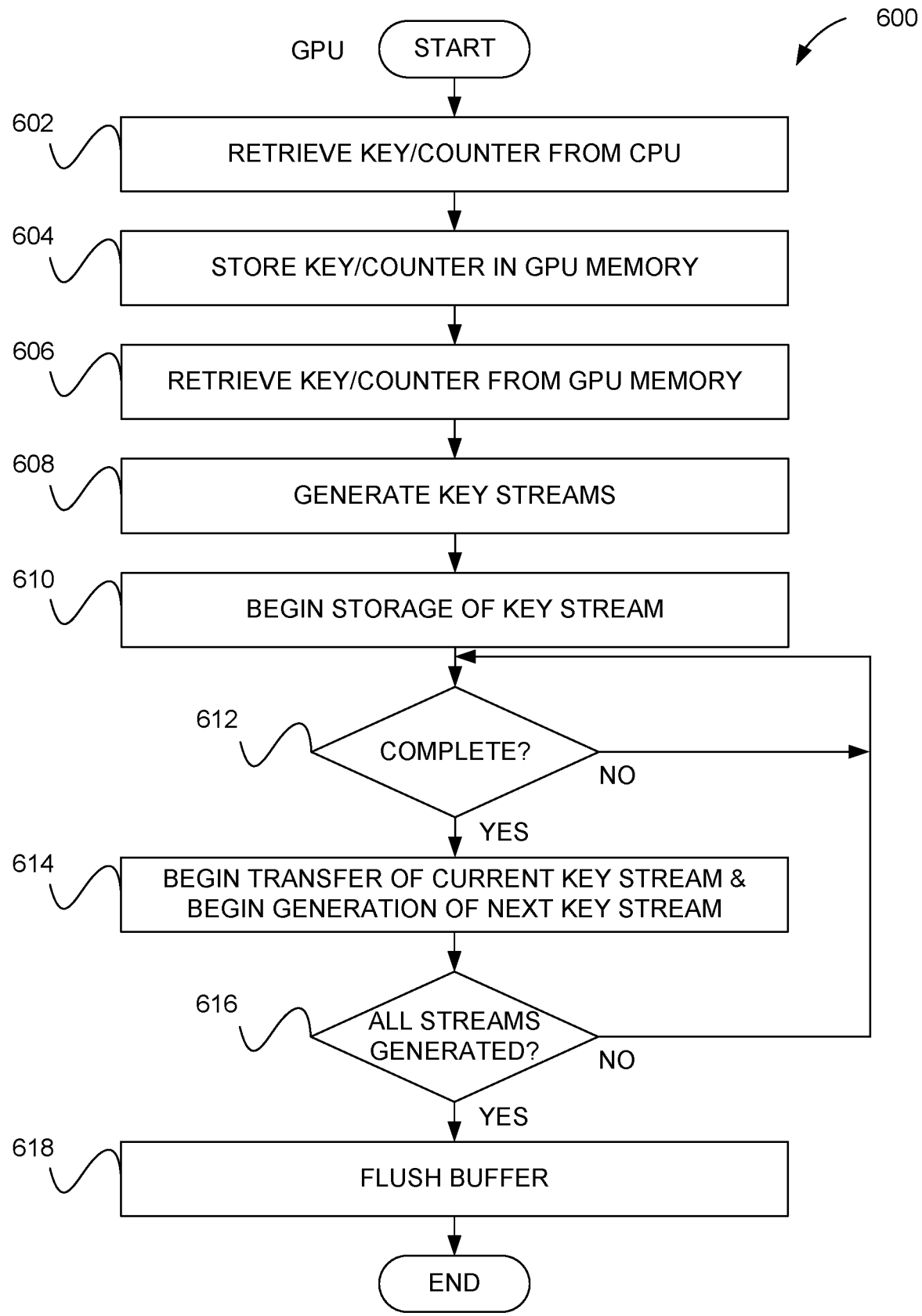
FIG. 6 illustrates a method for securing data using a graphics processor, in accordance with a graphics processor embodiment.

FIG. 6 illustrates a method 600 for securing data using a graphics processor, in accordance with a graphics processor embodiment. As an option, the method 600 may be implemented in the context of any one or more of the embodiments set forth in any previous and/or subsequent figure(s) and/or description thereof. For example, the method 600 may be carried out in the context of the graphics processor 102 of FIG. 1 and/or the graphics processor 208 of FIG. 2. However, it is to be appreciated that the method 600 may be implemented in the context of any desired environment.

As shown, the method 600 begins by a graphics processor (e.g. the graphics processor 102 of FIG. 1 and/or the graphics processor 208 of FIG. 2) receiving a key and counter from a central processor (e.g. the central processor 104 of FIG. 1 and/or the central processor 202 of FIG. 2). See operation 602. Thereafter, in operation 604, such key and counter is stored in graphics processor memory.

To this end, at a later time (or immediately after operation 604), the graphics processor retrieves the key and counter in operation 606 for generating key streams in operation 608. Storage of the key streams may begin (with a first stream) in operation 610. Once the generation of the first stream is complete (and possibly after the storage thereof is complete) per decision 612, transfer of such current stream is started while a next key stream is generated. See operation 614. In various embodiments, the aforementioned transfer and generation (of the next stream) may be started coincidently, or at different times insofar as the transfer and generation overlap, at least in part. Further, any key stream buffer may be overwritten (or flushed and written) in order to store each key stream prior to transfer. Once all streams are generated per decision 616, the buffer may be flushed in operation 618.

Figure 7:
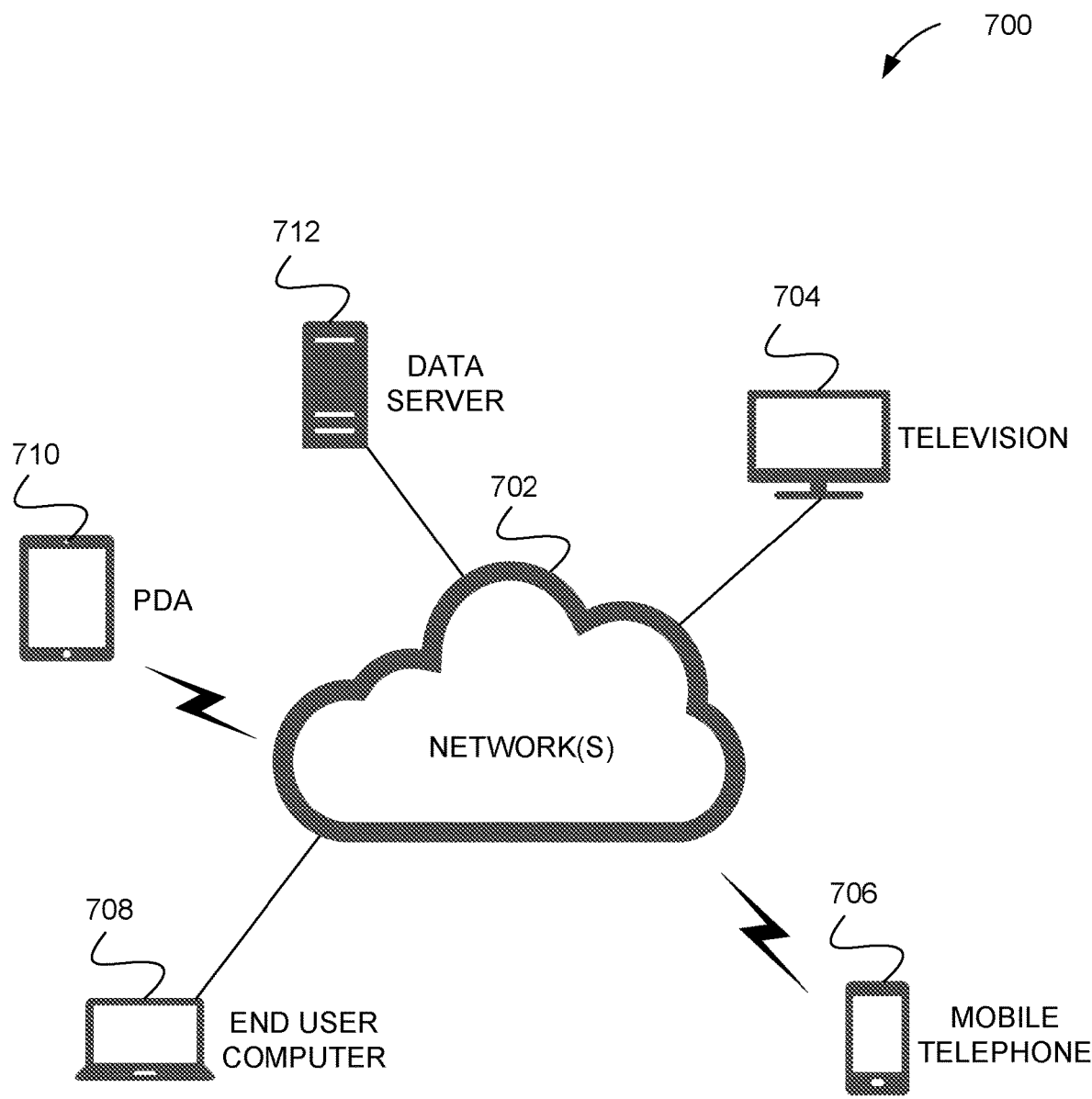
FIG. 7 illustrates a network architecture, in accordance with one embodiment.

FIG. 7 illustrates a network architecture 700, in accordance with one embodiment. As shown, at least one network 702 is provided. In various embodiments, any one or more components/features set forth during the description of any previous figure(s) may be implemented in connection with any one or more of the components of the at least one network 702.

In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 712 and an end user computer 708 may be coupled to the network 702 for communication purposes. Such end user computer 708 may include a desktop computer, lap-top computer, and/or any other type of logic. Still yet, various other devices may be coupled to the network 702 including a personal digital assistant (PDA) device 710, a mobile phone device 706, a television 704, etc.

Figure 8:
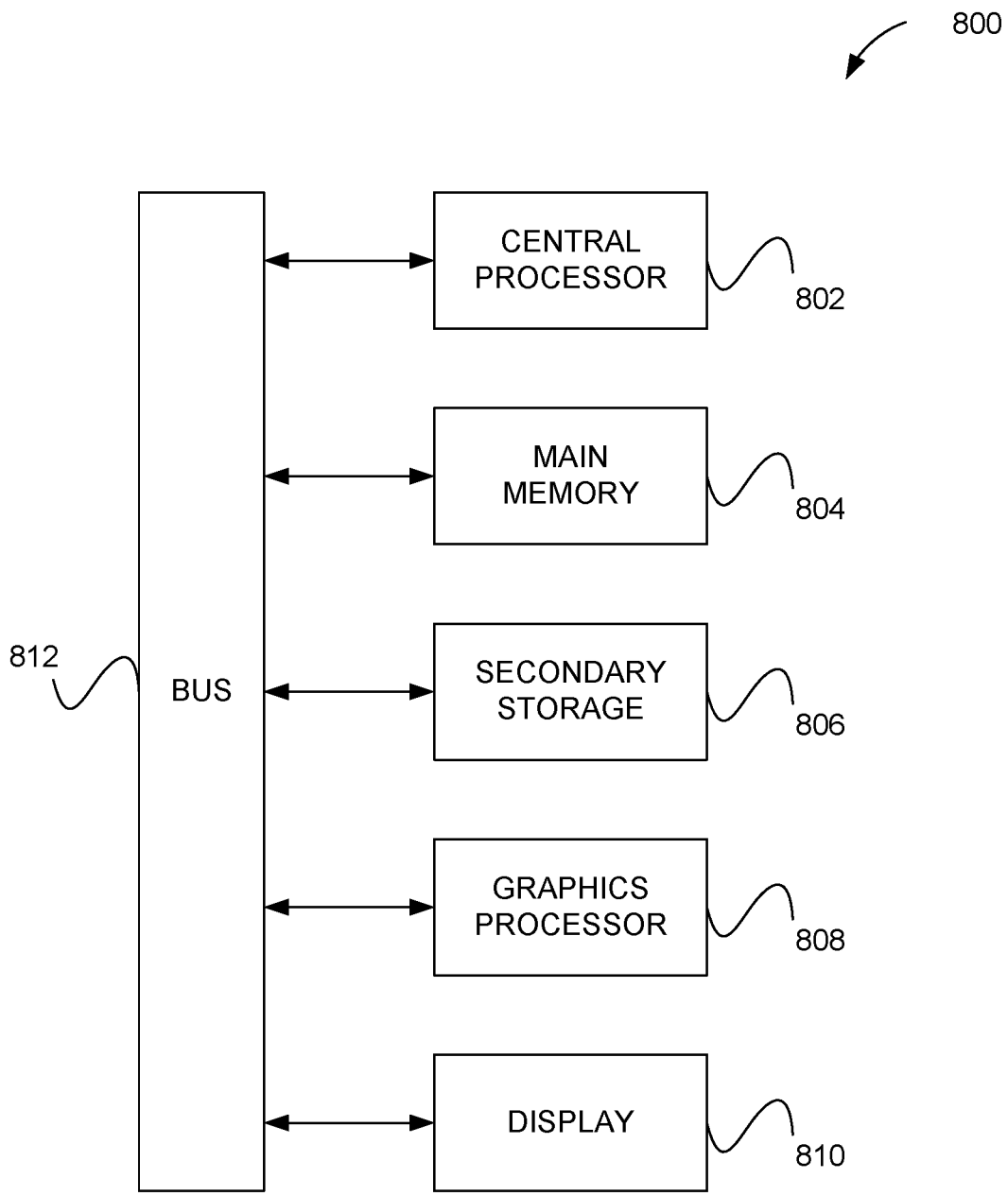
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. However, it is to be appreciated that the system 800 may be implemented in any desired environment.

As shown, a system 800 is provided including at least one central processor 802 which is connected to a bus 812. The system 800 also includes main memory 804 [e.g., hard disk drive, solid state drive, random access memory (RAM), etc.]. The system 800 also includes a graphics processor 808 and a display 810.

The system 800 may also include a secondary storage 806. The secondary storage 806 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 806, and/or any other memory, for that matter. Such computer programs, when executed, enable the system 800 to perform various functions (as set forth above, for example). Memory 804, secondary storage 806 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
   a central processor in communication with a graphics processor;
   the graphics processor configured to:
      generate a plurality of key streams utilizing a counter mode of operation, and
      transfer the plurality of key streams to memory of the central processor,
   wherein a first portion of the plurality of key streams are transferred to the memory of the central processor in parallel with the generation of a second portion of the plurality of key streams, by:
      beginning transfer of the first portion of the plurality of key streams from a key stream buffer to the memory of the central processor,
      while transferring the first portion of the plurality of key streams from the key stream buffer to the memory of the central processor,
      beginning generation of the second portion of the plurality of key streams,
         flushing the key stream buffer after transfer of the first portion of the plurality of key streams from the key stream buffer to the memory of the central processor is complete, and
         storing the second portion of the plurality of key streams in the flushed key stream buffer, upon generation thereof;
   the central processor configured to perform an XOR operation on the plurality of key streams and data.

2. The system of claim 1, wherein the counter mode of operation includes a Galois Counter Mode (GCM) of operation.

3. The system of claim 1, wherein the data includes at least one of plaintext or ciphertext.

4. The system of claim 1, wherein the central processor is further configured to transfer only a key and a counter to the graphics processor for use in connection with the generation of the plurality of key streams.

5. The system of claim 1, wherein the central processor is further configured to avoid transfer of the data to the graphics processor in connection with the generation of the plurality of key streams.

6. The system of claim 1, wherein the graphics processor includes a plurality of processing elements and is further configured to: utilize a counter in connection with the generation of the plurality of key streams, and adjust the counter for each of the plurality of processing elements.

7. The system of claim 6, wherein the graphics processor is further configured to adjust the counter based on a number of the processing elements and a size of a key stream buffer.

8. The system of claim 6, wherein the graphics processor includes a plurality of processing elements and is further configured to adjust an initialization vector for each of the plurality of processing elements.

9. The system of claim 1, wherein the graphics processor generating the plurality of key streams and the central processor performing the XOR operation on the plurality of key streams occur, at least in part, in parallel.

10. An apparatus, comprising:
    a graphics processor configured for communication with a central processor, the graphics processor further configured to:
       generate a plurality of key streams via a counter mode of operation; and
       transfer the key streams to memory of the central processor for use by the central processor in performing an XOR operation on the plurality of key streams and data;
    wherein a first portion of the plurality of key streams are transferred to the memory of the central processor in parallel with the generation of a second portion of the plurality of key streams, by:
       beginning transfer of the first portion of the plurality of key streams from a key stream buffer to the memory of the central processor, while transferring the first portion of the plurality of key streams from the key stream buffer to the memory of the central processor, beginning generation of the second portion of the plurality of key streams, flushing the key stream buffer after transfer of the first portion of the plurality of key streams from the key stream buffer to the memory of the central processor is complete, and storing the second portion of the plurality of key streams in the flushed key stream buffer, upon generation thereof.

11. The apparatus of claim 10, wherein the graphics processor is further configured to receive only a key and a counter for use in connection with the generation of the plurality of key streams.

12. The apparatus of claim 10, wherein the graphics processor is further configured to avoid receipt of the data in connection with the generation of the plurality of key streams.

13. The apparatus of claim 10, wherein the graphics processor includes a plurality of processing elements and is further configured to: utilize a counter in connection with the generation of the plurality of key streams, and adjust the counter for each of the plurality of processing elements.

14. The apparatus of claim 13, wherein the graphics processor is further configured to adjust the counter based on a number of the processing elements and a size of a key stream buffer.

15. The apparatus of claim 13, wherein the graphics processor includes a plurality of processing elements and is further configured to adjust an initialization vector for each of the plurality of processing elements.

16. A method, comprising:

receiving, from a central processor, a counter and a key at a graphics processor configured for communication with the central processor;

generating a plurality of key streams via a counter mode of operation, utilizing the graphics processor; and transferring the key streams to memory of the central processor for use by the central processor in performing an XOR operation on the plurality of key streams and data;

wherein a first portion of the plurality of key streams are transferred to the memory of the central processor in parallel with the generation of a second portion of the plurality of key streams, by:

beginning transfer of the first portion of the plurality of key streams from a key stream buffer to the memory of the central processor, while transferring the first portion of the plurality of key streams from the key stream buffer to the memory of the central processor, beginning generation of the second portion of the plurality of key streams, flushing the key stream buffer after transfer of the first portion of the plurality of key streams from the key stream buffer to the memory of the central processor is complete, and storing the second portion of the plurality of key streams in the flushed key stream buffer, upon generation thereof.

* * * * *